United States Patent [19]

van der Brug

[11] Patent Number: 4,802,007

[45] Date of Patent: Jan. 31, 1989

[54] PICTURE PICK-UP AND DISPLAY SYSTEM WITH ELECTRONIC AND PRINTED PICTURE DISPLAY

[75] Inventor: Gerard J. van der Brug, Eindhoven, Netherlands

[73] Assignee: U.S. Philips Corporation, New York, N.Y.

[21] Appl. No.: 127,815

[22] Filed: Dec. 1, 1987

[30] Foreign Application Priority Data

Dec. 18, 1986 [NL] Netherlands ............ 8603220

[51] Int. Cl.$^4$ ............................................. H04N 7/02
[52] U.S. Cl. ..................................... 358/139; 358/10; 358/76
[58] Field of Search ............ 358/139, 10, 335, 76

[56] References Cited

U.S. PATENT DOCUMENTS 4,213,147  7/1980  von Buenau ............ 358/139 X
4,415,927  11/1983  Penney ................ 358/139
4,682,246  7/1987  Efron et al. .......... 358/139 X

FOREIGN PATENT DOCUMENTS 0144188  6/1985  European Pat. Off. .

Primary Examiner—Howard W. Britton
Assistant Examiner—Victor R. Kostak
Attorney, Agent, or Firm—Michael E. Marion

[57] ABSTRACT

A system having a picture pick-up device (CAM) such as a camera, a picture signal storage device (Dsc) in the form of a disc, for example, and in a picture signal source (VPC) a playing device (VP) suitable for this disc, coupled to an electronic picture display device (Vmon) or still picture printer (Prt), respectively. During the adjusting operation a reference test pattern signal coming from a generator (Tst) is applied to the picture display device (Vmon) or printer (Prt), respectively, through a picture signal processing circuit (Proc). Subsequently, the pick-up device (CAM) picks up the picture displayed or the picture printed, respectively, and the picture signal obtained thus is stored in a storage device (Dsc). Then, this picture signal and the reference picture signal are compared in a signal comparing circuit (Comp). Adjusting data corresponding with the differences between these signals are stored in a memory (Mem) coupled to the circuit (Proc). Thus, with the electronic and printed picture display a video channel (V) as well as a printing channel (P) are adjusted. The two channels (V and P) are coupled by setting means (Adj. Proc), so that on account of the picture quality observed on the picture display device (Vmon) a changed picture quality of the printed picture of the (Prt) device is available.

5 Claims, 1 Drawing Sheet

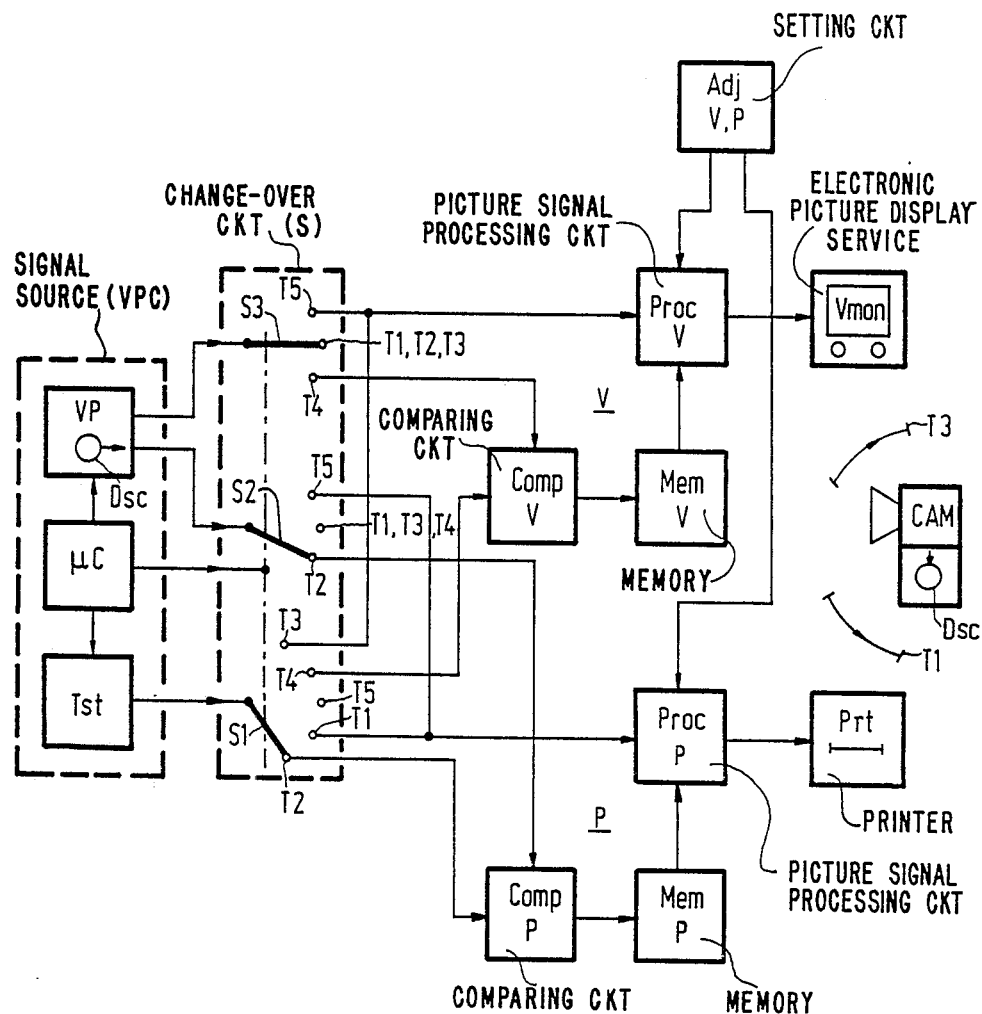

PICTURE PICK-UP AND DISPLAY SYSTEM WITH ELECTRONIC AND PRINTED PICTURE DISPLAY

BACKGROUND OF THE INVENTION

The invention relates to a picture pick-up and display system featuring electronic and printed picture displays. The system comprises adjusting means and setting means for effecting an adjustment in order to achieve, subsequently, a picture having a quality adjusted on the basis of the quality of an electronic picture previously observed. The system further comprises a video channel and a printing channel incorporating an electronic picture display device having a picture display screen or a still picture printer, respectively, the picture display device and printer, respectively, being coupled to a picture signal source through a picture signal processing circuit. In the video channel, the respective picture signal processing circuit is coupled to a memory to store the adjusting data. The memory is coupled to a signal comparing circuit thereby providing the adjusting data during the adjusting procedure along with a reference test pattern signal and a signal originating from a pick-up device which picks up a test pattern displayed on the picture display screen of the electronic picture display device representing a test pattern signal.

Such a picture pick-up and display system is known from the European Patent Application No. 0,147,813 (U.S. Pat. No. 4,639,770) which describes a system suitable for colour display and colour printing, whilst the electronic picture display device is designed as a colour television monitor. The picture signal source comprises a repeatedly readable picture storage device for storing a colour picture signal and further comprises a colour television camera as the picture pick-up device. The pick-up device for picking up the picture of the colour monitor is designed as a colour measuring apparatus and the signal supplied by this device is applied to a storage device contained in the signal comparing circuit further comprising a reference memory for storing the reference test pattern signal corresponding to reference basic colours laid down in a standard. The signal comparing circuit is connected with various outputs to this controllable test pattern signal generator coupled to the signal processing circuit. An output of the signal comparing circuit is further connected to the memory device for the adjusting data and inside this device to a measuring stage coupled to the signal processing circuit for measuring purposes. This memory device further contains a calcalcuating stage and a storage device for storing the adjusting data obtained after the measurement and the calculations desired.

Adjusting the video channel implies calibrating the channel. When a calibration is effected, depending on the result of the comparison between a test colour recorded and the relevant reference test colour, the test pattern signal generator is adjusted to that colour, until the minimal difference is attained. Subsequently, the measurement is effected for loading of the memory device for storing the adjusting data.

It is described that subsequent to the calibration of the video channel, while observing the colour picture on the colour monitor, colour changes can be introduced into the picture with the aid of setting means which changes correspond to the colour changes desired in the printed picture.

In the system described hereinbefore comprising the video channel adjustment or calibration it is assumed that the printing channel does not need any calibrating so that no measures are indicated to this extent. It is presupposed that the printing channel meets the standard.

SUMMARY OF THE INVENTION

The instant invention has for its object to provide a picture pick-up and display system suitable for an adjustment in which no reference basic colours laid down in a standard are used and in which system the data processing in the video channel is coupled to that in the printing channel such that a change in the setting of the signal processing in the video channel has an optimum correlation with a corresponding change in the signal processing in the printing channel. A picture pick-up and display system according to the invention is therefore characterized in that the printing channel as well as the video channel comprises a signal comparing circuit and a memory for storing the adjusting data. When adjustments are effected inputs of the comparing circuits in the video and printing channels are connected to an output of the respective picture signal source supplying a reference test pattern signal and a further output of the picture source which supplies a signal obtained from a pick-up device which signal corresponds to the test pattern displayed, the pick-up device being designed as a picture pick-up device for supplying a picture signal to displayed and the setting means being incorporated in both the video channel and the printing channel.

When adjustments are made for each channel a closed loop is formed in the picture pick-up and display system and the associated specific transfer characteristic between pick-up and display is represented by the adjusting data stored in the memory. As the setting means are comprised in the two channels which have been adjusted separately, the maximum correlation between the setting changes of the two channels is achieved; there is a maximum coupling between the two specific transfer characteristics in the two closed loops each comprising the picture signal source, the picture signal processing circuit with setting means, the picture display device or still picture printer, respectively, and the picture pick-up device operating for the picture signal source. The two memories each having the specific adjusting data provide the coupling.

It should be noted that in the European Patent Specification No. 0,144,188 a picture pick-up and display system is disclosed. In this system however, only a printing channel is used. Adjustment takes place by picking up a test pattern chart with a picture pick-up device processing the signal and applying the picture signal thus obtained to a still picture printer for making a test pattern print, subsequent to which the test pattern chart and then the test pattern print are picked up by a pick-up device in the form of a colour measuring device and the measuring results are applied to a signal comparing circuit, providing adjusting data for the maximum correlation to be stored in a memory device coupled to the signal processing circuit.

The present Patent Application rises above the prior art in its advantages described as follows: by the combination of the similarly configured video and printing channels; because the picture pick-up device is utilized not for a possible picking up of the test pattern chart leading to the test pattern print, but certainly for obtaining the adjusting data for picking up the test pattern print and because the setting means are incorporated both in the video channel and the printing channel. In this connection it is essential that the picture pick-up device itself operates for obtaining the adjusting data.

An embodiment of a picture pick-up and display system according to the invention, is characterized in that the picture pick-up device forms a combination with a picture signal storage device for applying thereto a picture signal corresponding with a scene, the picture signal source comprising a playing device suitable for the picture signal storage device from the aforesaid combination.

A further embodiment of the invention is characterized in that the picture signal source further comprising a reference test pattern signal generator can be coupled to the said signal processing circuits and signal comparing circuits through a signal change-over circuit in a four-step adjusting cycle.

DETAILED DESCRIPTION OF THE INVENTION

The invention will be further explained with reference to the accompanying drawing showing by way of example a picture-pick-up and display system in accordance with the invention.

The accompanying drawing shows a block diagram in which CAM denotes a picture pick-up device for supplying a picture signal corresponding with a scene. The CAM device, for example, is an electronic photo or slide camera or a (television) camera with which single still pictures or series of them can be taken. The CAM device is capable of taking colour and/or monochrome pictures. The picture signal occurring in the CAM device is applied to an attached picture signal storage device Dsc to be stored therein and the two devices together form a combination (CAM, Dsc). The stored picture signal can be analogue or digital, depending on the design of the Dsc device. By way of example, a disc design is used onto which the digitized picture signal is introduced in tracks. Further embodiments having programmable digital memories are possible.

The storage device Dsc containing picture information which is supplied by the CAM device and having, for example, the form of a disc, can be played in a picture signal source VPC. For clarity, the VPC signal source is merely drawn comprising a playing device VP for the disc Dsc, a micro computer $\mu$C and an electronic reference test pattern signal generator Tst. From the micro computer $\mu$C are controlled the playing device VP, the generator Tst as well as a signal change-over circuit S. The circuit S has two inputs coupled to two outputs of the playing device VP and one input coupled to an output of the generator Tst Circuit S comprises three change-over switches S1, S2 and S3 drawn as mechanical change-over switches, but which can be designed as electronic switching circuits. A dash-and-dot line indicates a coupling between the change-over switches S1, S2 and S3, which is controlled by the microcomputer $\mu$C. The change-over switch S1 has one input contact coupled to the output of the generator Tst and five output contacts denoted T1, T2, T3, T4 and T5, the latter T5 not being interconnected but being free. The change-over switch S2 or S3, respectively, comprises an input contact coupled to one of the outputs of the playing device VP and three output contacts. The change-over switch S2 has one free contact denotes T1, T3, T4 and two output contacts denoted T2 and T5, respectively. The change-over switch S3 has one free contact denoted T1, T2, T3 and two output contacts denoted T4 and T5. The FIGURE shows the condition of the change-over circuit S wherein the contacts T2 of the change-over switches S1 and S2 and the contact T1, T2, T3 of the change-over switch S3 are connected to the associated input contact. Simultaneous interconnection of the contacts T is indicated by the reference numeral added thereto.

The contact T5 of the change-over switch S3 and the contact T3 of the change-over switch S1 are interconnected and coupled to an input of a picture signal processing circuit Proc V. The contact T5 of the change-over switch S2 and the contact T1 of the change-over switch S1 are coupled likewise to an input of a picture signal processing circuit Proc.P. The contacts T4 of the change-over switches S3 and S1 are each coupled to a respective input of a signal comparator circuit Comp V. The contacts T2 of the change-over switches S2 and S1 are each coupled to a respective input of a signal comparing circuit Comp P. An output of the respective circuits Comp V and Comp P is coupled to an input of a respective memory Mem V and Mem P, an output of which being coupled to an input of the respective circuits Proc V and Proc P. A further input of each of the circuits Proc V and Proc P is coupled to an output of a setting circuit Adj V, P. An output of the circuits Proc V and Proc P is coupled to an input of a respective electronic picture display device Vmon and a still picture printer Prt. The Vmon device can be designed as a television monitor or a receiver. The printer Prt can be designed as an arbitrary picture printer based on photography, infrared or ultraviolet radiation, heat, ink pressure etc.

For a further explanation of the operation of the embodiment of the picture pick-up and display system shown in the FIGURE, the following components are comprised therein: a video channel V further to be indicated by (Vmon, Proc, Mem, Comp, Adj), a printing channel P further indicated by (Prt, Proc, Mem, Comp, Adj), adjusting means ($\mu$C, Tst, S, Comp, Mem) for the two channels V and P, setting means (Adj, Proc) likewise for the two channels V and P, the setting means comprising the setting circuit (Adj V, P).

For a further explanation of the adjusting procedure of the system it should be noted that a specific cycle (T1, T2, T3, T4) of four steps is described which might also have the order or (T3, T4, T1, T2). Either one or the other four-step cycle is realized by the switching circuit S, given by way of example, under the control of the microcomputer $\mu$C.

During the first step T1 of the cycle the changeover switches S2 and S3 are connected to the respective free contacts T1, T3, T4 and T1, T2, T3 whilst the test pattern signal generator Tst is connected to the signal processing circuit Proc P via switch S1. The memory Mem P and the setting circuit Adj V, P, are assumed to have a certain rest or zero state. The signal of the test pattern is transferred to the printer Prt via the circuit Proc P and a print of the test pattern is made. Subsequently, a picture is taken of the test pattern print by means of the pick-up device CAM, which is shown in the FIGURE by the circle-section provided with an arrow suggesting motion and the indication T1. The resulting picture signal is stored in the picture signal storage device Dsc attached to the CAM device. Then, the Dsc device is transferred to the playing device VP in the signal source VPC.

During the second step T2 of the cycle the change-over circuit S has assumed the condition shown in the FIGURE. The generator Tst and the playing device VP are connected to the signal comparing circuit Comp P. The Comp P circuit now receives as a reference the signal of the test pattern coming in from the generator Tst and the signal of the test pattern coming in via the CAM, Dsc and VP devices. Signal differences established on comparison are stored as corresponding adjusting data in the memory Mem P, taking it out of the state of rest or zero and bringing it into the adjusted state. This implies that if the two steps T1 and T2 were repeated, the differences found on signal comparison would not lead to any appreciable change of the adjusting data stored. There can be present in the circuit Comp P a signal threshold which has to be passed first before the adjusting data stored are readjusted.

Subsequently, the third step T3 of the cycle is carried out which is equal to the first step T1 but for the difference of the video channel V being rendered operative instead of the printing channel P. The display screen of the Vmon device shows the test pattern, which is picked up by the CAM device (illustrated with line section T3) and the picture signal obtained is stored in the Dsc device.

Then, during the fourth step T4 of the cycle, as described with step T2, the signal comparison (Comp V) is made between the reference signal of the test pattern and the picture signal obtained therefrom and adjusting data corresponding to the signal differences are stored in the memory Mem V.

After the aforedescribed cycle (T1, T2, T3, T4) tye picture pick-up and display system is adjusted and the contacts T5 of the change-over switches S2 and S3 are interconnected as output contacts, whilst the contact T5 of the change-over switch S1 is free.

The adjustment implies that per P and V channel the two respective steps T1 and t2 and T3 and T4 have effected a calibration as it were. This calibration takes place in a closed loop per channel. For the printing channel P there is a closed loop (Tst, Proc P, Prt, CAM, Dsc, VP, Comp P, Mem P, Proc P). For the video channel V there is a closed loop as well (Tst, Proc V, Vmon, CAM, Dsc, VP, Comp V, Mem V, Proc V). The adjusting data stored in the memories Mem P and Mem V compensate for all errors occurring during the pick-up, processing and displaying of the signals.

A changed setting value of the Proc circuit in the V or P channel obtained from the setting circuit Adj V, P will have the expected, desired effects on the picture display.

In addition to the aforedescribed adjustment per channel V or P a further adjustment is realized between the channels with the aid of setting means (Adj, Proc). This implies that a changed setting of the picture signal of the Proc V circuit, obtained through the setting circuit Adj V, P, entails a changed setting of the Proc P circuit. When observing a picture on the screen of the Vmon device, the setting circuit Adj V, P can be readjusted accordingly for realizing a changed picture quality desired on the screen of the Vmon device as well as in the print produced by the printer Prt. Via the setting circuit Adj, V, P and the memories Mem an optimal coupling is established between the transfer characteristic in the two closed loops of the picture signals (VP, Proc V, Adj, Vmon, CAM, Dsc) and (VP, Proc P, Adj, Prt, CAM, Dsc).

As observed before with respect to the FIGURE, the signal of the test pattern is generated electronically. This is the simplest way of having the signal of the test available to be supplied to circuits Proc on the one side and then to the circuits Comp on the other. A separate test chart picked up by the picture pick-up device CAM and of which the signal obtained is stored in a separate memory substituting for the Tst generator can be used in combination or separately.

As regards the test pattern it should be noted that this can be a standardized test pattern or a simplified version showing, for example, colour bars or monochrome bars having a shade of white, via grey levels to black. Such an adjustment can be made for colour, gamma, contrast etc. For further adjustments a signal commonly referred to as window signal could be used for a gate signal, due to which the signal comparison is only made in an accurately defined picture area.

It should be noted that the embodiments of the devices and circuits described can be analogue or digital. The couplings between them can be designed to have multiple connection wires and comprise signal amplifiers, signal correcting circuits and circuits of a different design.

I claim:

1. A picture pick-up and display system comprising:
    (a) a picture pick-up means for generating an image carrying signal from an image;
    (b) video means for providing a video image from said signal, said video means comprising means for calibration thereof so that said image is optimally represented by said video image;
    (c) printing means for providing a print image from said signal, coupled to said video means, said printing means comprising means for calibration thereof so that said image is optimally represented by said print image; and
    (d) means for simultaneously adjusting said video means and said printing means,
    whereby said print image can be adjusted while observing said video image.

2. The picture pick-up and display system of claim 1 wherein said video means further comprises:
    (a) first comparing means for comparing said video image signal to a reference image thereby providing a video adjustment signal;
    (b) first storage means for storing said video adjustment signal, connected to said first comparing means; and
    (c) first processing means for modifying a subsequent video image in accordance with said video adjustment signal.

3. The picture pick-up and display system of claim 2 wherein said printing means further comprises:
    (a) second comparing means for comparing said print image to said reference image thereby providing a print adjustment signal;
    (b) second storage means for storing said print adjustment signal, connected to said second comparing means; and
    (c) second processing means for modifying a subsequent print image in accordance with said print adjustment signal.

4. A picture pick-up and display system as claimed in claim 1, characterized in that said picture pick-up means forms a combination with a picture signal storage means and a picture signal source means comprising a playing device suitable for said picture signal storage means.

5. A picture pick-up and display system as claimed in claim 4, characterized in that said picture signal source means further comprises a reference test pattern signal generator alternatively coupled to said video means and said printing means through a change-over circuit.

* * * * *